United States Patent [19]

Dehait

[11] 4,097,158
[45] Jun. 27, 1978

[54] HALF-MAXIMUM THRESHOLD CIRCUIT FOR OPTICAL MICROMETER

[75] Inventor: Jack T. Dehait, Dayton, Ohio

[73] Assignee: Systems Research Laboratories, Inc., Dayton, Ohio

[21] Appl. No.: 757,218

[22] Filed: Jan. 6, 1977

[51] Int. Cl.² .............................................. G01B 11/08
[52] U.S. Cl. .................................... 356/160; 250/560; 356/167
[58] Field of Search ................ 356/160, 167; 250/560, 250/571

[56] References Cited
U.S. PATENT DOCUMENTS

| | | | |
|---|---|---|---|
| 3,712,741 | 1/1973 | Revert | 356/167 |
| 3,782,834 | 1/1974 | Fujimori et al. | 356/167 |
| 3,844,659 | 10/1974 | Baganoff | 356/167 |

FOREIGN PATENT DOCUMENTS 2,402,059  8/1974  Germany ............................. 356/167

Primary Examiner—Paul A. Sacher
Assistant Examiner—R. A. Rosenberger
Attorney, Agent, or Firm—Biebel, French & Nauman

[57] ABSTRACT

An optical micrometer includes circuit means for determining accurately the passage of a scanning beam of light across the edges of an article placed within the zone of measurement. By sensing the half power point of the beam as received by a photodetector, the accuracy of the measurement is made independent of the intensity of the scanning beam. The half power point is determined by comparing the amplitude of the photodetector output signal with its responsive half amplitude value. Since it is not possible to determine half-amplitude value until after full amplitude has been reached, delay means are provided, the amount of delay being determined by the dimensions of the beam and the scanning rate.

10 Claims, 12 Drawing Figures

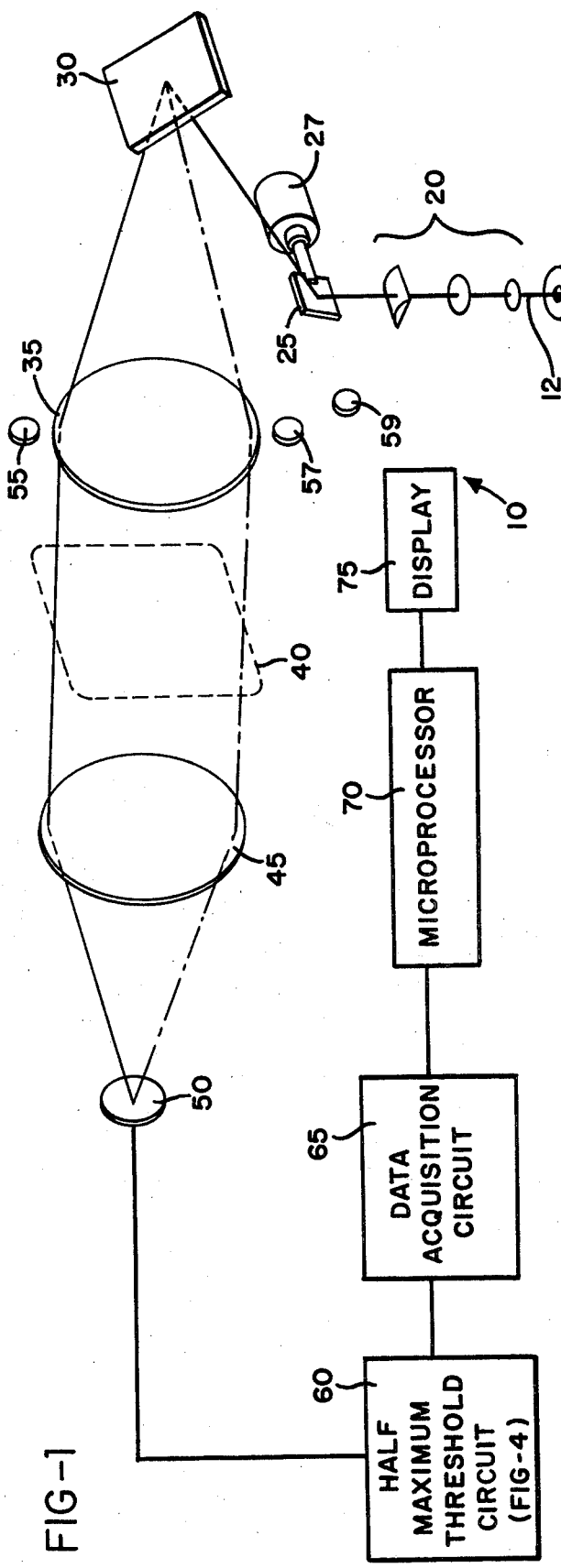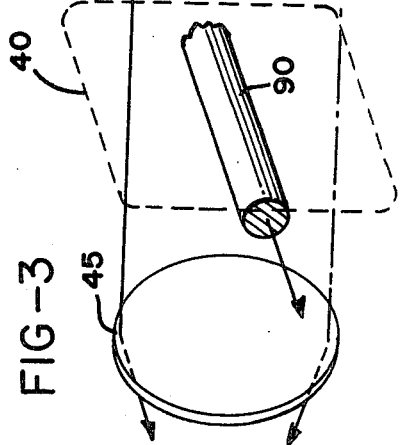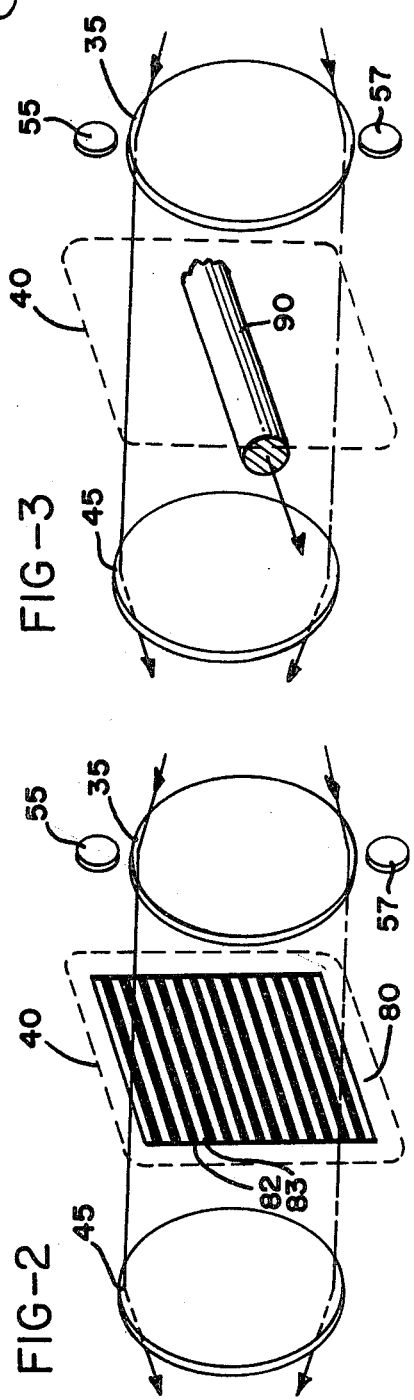

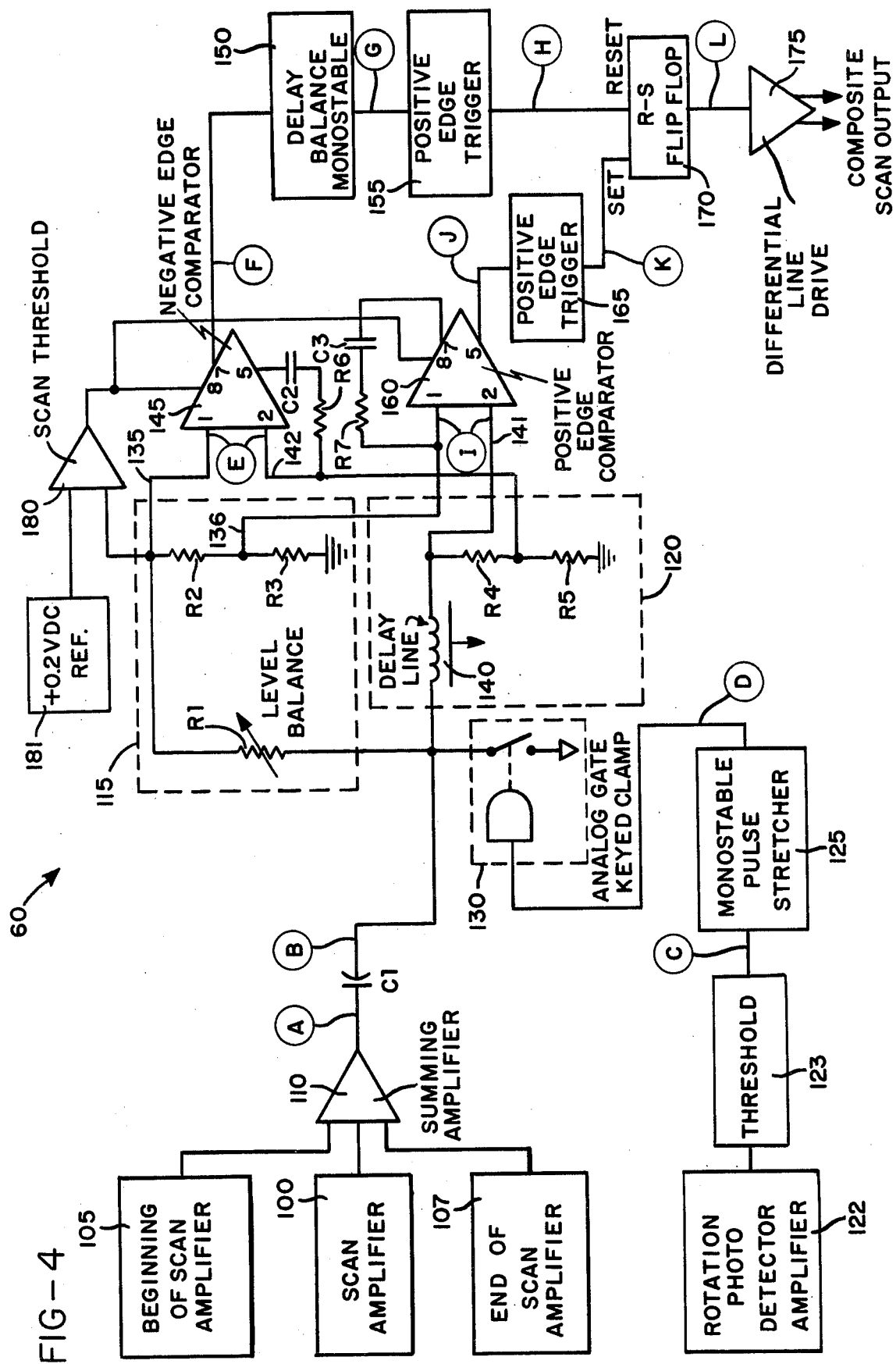

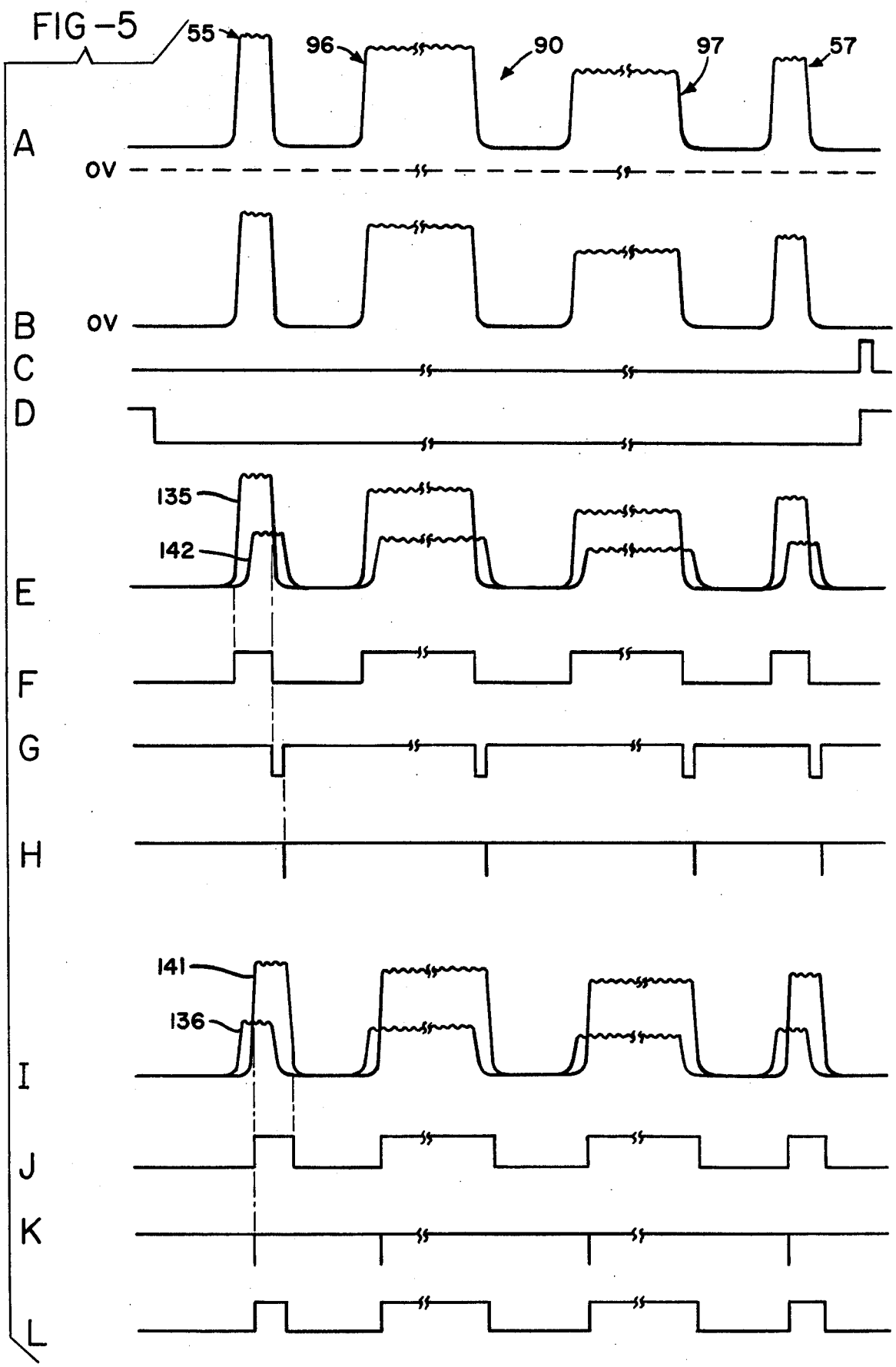

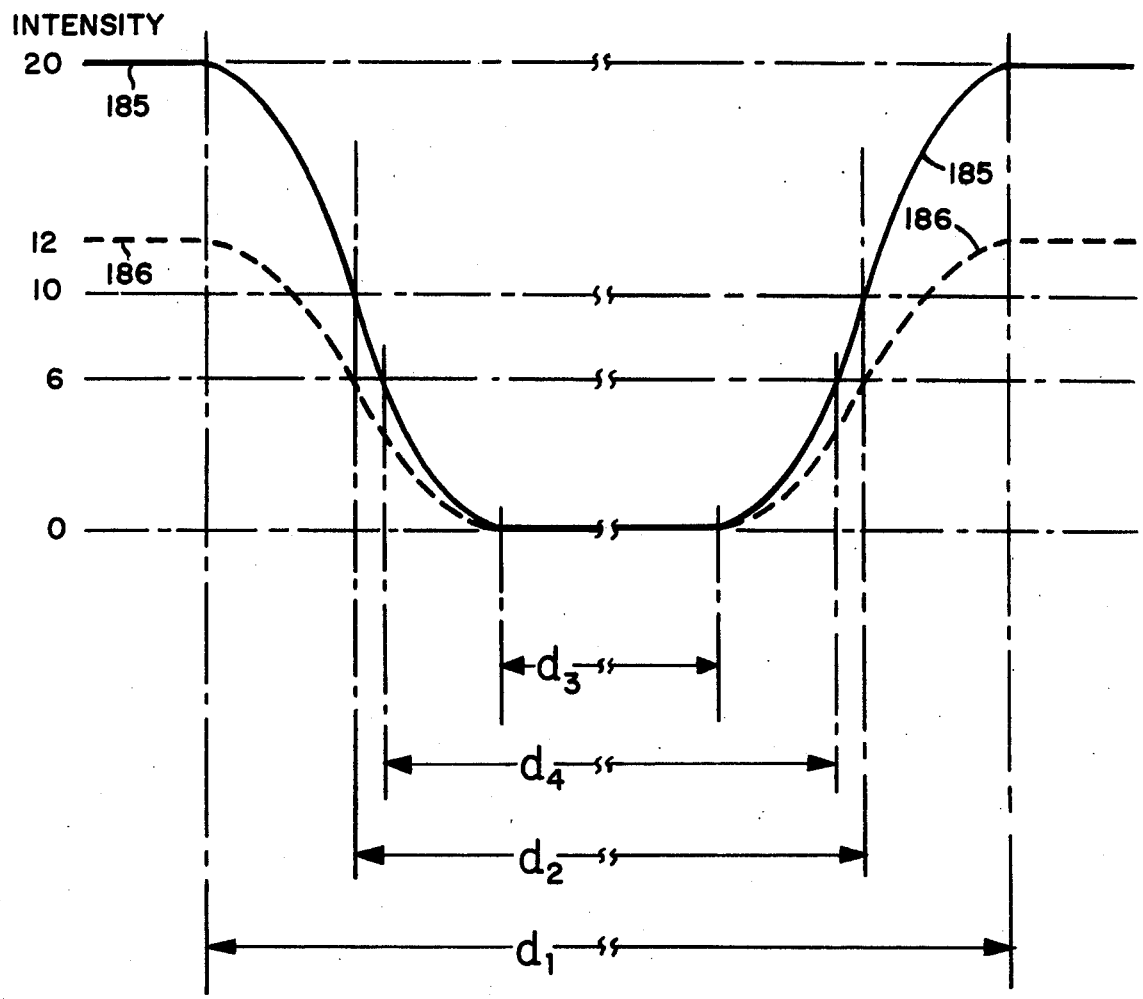
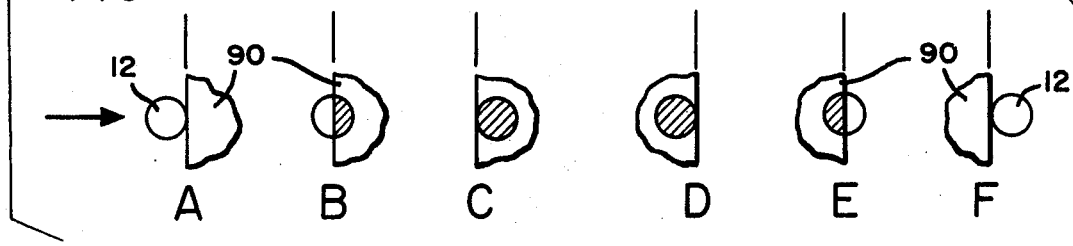

4,097,158

HALF-MAXIMUM THRESHOLD CIRCUIT FOR OPTICAL MICROMETER

BACKGROUND OF THE INVENTION

This invention relates to an optical dimension gauging instrument, commonly referred to as an optical or laser micrometer, and more specifically to a method and apparatus for determining precisely when the beam crosses the edges of the object being measured.

In an optical micrometer, a laser is frequently used to generate a beam of collimated light which is caused to be scanned repeatedly across a measurement zone by means of a rotating mirror. The time of passage of the beam across the edges of the article is detected and compared against the rate at which the beam scans to determine the dimension of the article.

The accuracy of an optical micrometer is controlled in part by the dimension of the beam in the direction of scan and the technique employed to determine accurately when the beam crosses the edge of the article; and the accuracy of many optical micrometers can be improved by refining this last mentioned technique.

Various techniques have been employed to determine the passage of the beam across the edge of the article, as illustrated by U.S. Pat. Nos. 3,765,774 and 3,856,412.

SUMMARY OF THE INVENTION

This invention relates to an improved method and appparatus for determining the passage of the beam across the edges of an article placed within the zone of measurement of an optical micrometer.

In the present invention, an electrical circuit is provided which senses the intensity or power output of the scanning beam, as represented by the electrical output from a sensing photodetector, and determines when this output reaches the one-half point value. The one-half power point will occur at the same time or at the same position of the beam with respect to the article independently of the intensity of the beam at that location, and therefore will provide an accurate means for determining the location of the edges of the article within the zone of measurement.

As the beam scans across an article, the electrical output of the photodetector will decrease as the beam is obscured by the first or leading edge of the article, and thereafter increases as the beam emerges from the other or trailing edge of the article. The decrease in the output of the photodetector is defined as the negative edge of the output signal while the increase in light value is defined as the positive edge of the signal. Both the positive and negative edges of the photodetector output signal are compared against their respective one-half amplitude value, and it is this comparison which provides an output indicating the transition of the beam across the edges of the article as well as the time required for the beam to complete a measurement scan cycle.

Since each edge is compared against its half-amplitude value, the intensity of the beam may vary from point to point throughout the zone of measurement of the optical micrometer without adversely affecting the accuracy of the dimension measurement of the article.

Since it is not possible to determine the half-amplitude value of the beam until the beam has reached its full intensity, delay means are provided in the preferred embodiment of the invention to delay the comparison of the signal until its full amplitude intensity has been reached. The amount of delay will be a function of the size of the beam and the rate of scan, thus enabling the beam to transition from its highest to lowest amplitude level at the slowest scan rate anticipated during normal operation of the optical micrometer.

For the positive edge measurement, the full intensity signal is delayed and compared against a one-half amplitude value of that same signal. For the negative edge measurement, the half-magnitude value signal is delayed to provide the comparison. To compensate for the delay, a second delay circuit is provided in the output of the negative edge comparator. The outputs of the comparators are combined to provide composite signal which accurately represents the time the beam passes the edges of the article within the zone of measurement.

Each comparator is provided with feedback circuitry which prevents multiple outputs on slowly rising signals. Furthermore, the inputs to the comparators are shorted to ground or zero reference level prior to each scan cycle to minimize storage effects as a result of AC coupling between the photodetector circuits and the comparison circuits.

Specifically, the invention includes first circuit means responsive to said electrical signals from said light sensing means for providing a first output representing said signals and a second output representing a fixed percentage of said signals, second circuit means responsive to the output of said light sensing means for delaying said electrical signals by a predetermined time and for providing a first output representing the delayed signals and a second output representing a fixed percentage of said delayed signals, first comparator circuit means responsive to the first output of said first circuit means and to the second output of said second circuit means for generating an output at one transition of said signals, second comparator circuit means responsive to the second output of said first circuit means and to the first output of said second circuit means for generating an output at the other transition of said signals, means for delaying the output of the first comparator circuit means, and output circuit means for combining the delayed output of the first comparator circuit means and the output of the second comparator circuit means thereby to provide a composite signal representing accurately the location of the edges of the article independently of changes in the magnitude of electrical signals.

Accordingly, it is an object of this invention to provide a method for determining the size of an object placed within the zone of measurement of an optical micrometer of the type using a scanning beam of light by determining when the light beam crosses each of the edges of the article including the steps of sensing the light beam after it passes through the zone of measurement, generating a first output signal when one half of the beam is obscured by the first edge of the article, generating a second output signal when one half of the beam emerges from the other edge of the article, and combining the first and second output signals to provide a composite output signal which represents the size of the article within the zone of measurement.

It is a further object of this invention to provide an optical micrometer wherein a light beam is scanned across a zone of measurement and the intensity of the beam passing therethrough is converted into electrical signals by photodetector means and wherein the dimension of an article placed within the zone of measurement is determined accurately by circuit means including means for generating a first output signal when the intensity of the beam, as it is obscured by the edge of the article, reaches its half point, means for generating a second output signal when the intensity of the beam, as it emerges from the other edge of the article, reaches its one-half power point, and means for combining said first and second output signals to provide a composite output signal which represents the size of the article within the zone of measurement.

Other objects and advantages of the invention will be apparent from the following description, the accompanying drawings and the appended claims.

Brief Description of the Drawings

FIG. 1 is a diagrammatic view of an optical micrometer and a block diagram of the electrical system for processing dimension information;

FIG. 2 is a partial diagrammatic view showing a calibration grate positioned in the zone of measurement;

FIG. 3 is a partial diagrammatic view showing the article to be measured situated within the zone of measurement;

FIG. 4 is an electrical diagram of a half-maximum threshold circuit;

FIG. 5 are waveform diagrams showing electrical signals at several locations within the circuitry of FIG. 7;

FIG. 6 is a waveform illustrating the passage of the scanning beam across the edges of an object placed in the zone of measurement; and FIGS. 7a–7F illustrate the physical relationship of the scanning beam with the article.

DESCRIPTION OF THE PREFERRED EMBODIMENT

Reference is made to FIG. 1 which is a diagrammatic view of an opical micrometer constructed according to this invention. The optical micrometer, shown generally at 10, includes means for generating a beam 12 of collimated light, such as a laser 15, and may include an optical system 20 to modify that beam of light in accordance with the type of material to be measured and the environment in which that measurement is to be made. The beam is reflected off a mirror 25 rotated by means of motor 27 and is further directed by a stationary mirror 30 through a scan lens 35, a zone of measurement, shown generally at 40, a second scan lens 45 and onto a photodetector element 50.

Also included are photodetector elements 55 and 57 which detect the beam prior to and after it moves vertically through the zone of measurement; and thus the outputs of these photodetectors represent the beginning and end of each scan cycle. Photodetector 59 senses that the laser is operating and that the motor 27 is actually rotating the mirror 25 and thus causing the beam to scan vertically, in the embodiment shown in FIG. 1, through the zone of measurment.

The outputs of the photodetectors 50, 55 and 57 are applied to the half-maximum threshold circuit 60 which is more completely shown in FIG. 4; the output of this device is applied to a data acquisition circuit 65, and the output of the circuit 65 is applied to the microprocessors 70. The data acquisition circuit 65 and the microprocessor 70 are more completely described in copending application Ser. No. 757,217, now U.S. Pat. No. 4,082,463, issued Apr. 4,1978, filed on even date herewith. The dimension of the article placed within the zone of measurement may be determined visually by means of display 75.

In FIG. 2, a calibrating grate 80, which preferably includes alternate opague and light transparent segments 82 and 83, is temporarily positioned within the zone of measurement, and the beam is caused to scan vertically downwardly across the photodetectors 55 and 57 and through the grate 80 onto photodetector 50 to produce output signals which can then be used to linearize the measurement of an article, such as a wire 90 placed in the zone of measurement, shown in FIG. 3.

The grate is preferably a precision optical device which, as shown in FIG. 2, includes a plurality of precisely spaced segments. The exact dimensions of these segments are known and this information is stored in the microprocess or 70 which uses this information to provide an accurate measure of the dimension of an article, regardless of its position within the zone of measurement and any non-linearities existing in the optical system.

Referring now to FIG. 4 which is a schematic electrical diagram of the half-maximum threshold detector 60, and FIG. 5 which is a set of waveforms showing the electrical signal at various parts of the circuit, the scan photodetector element 50 is connected to amplifier 100, and the beginning-of-scan photodetector 55 and end-of-scan photodetector 57 are connected to amplifiers 105 and 107, respectively. The outputs of these amplifiers are connected to a summing amplifier 110, the output of which, shown as waveform A in FIG. 5, is capacitively coupled through capacitor C1 (see waveform B) to a first circuit means 115 and a second circuit means 120.

The rotation photodetector 59 is connected through an amplifier 122 to a threshold detector circuit 123, and its output (waveform C) is applied to a monostable pulse stretcher circuit 125. As long as the laser 15 is activated and the mirror 25 is rotating, periodic pulses of light applied to the photodetector 59 will cause an output (waveform D) from the monostable pulse stretcher 125 after the scan cycle, and thus the output of the summing amplifier 110 may be applied to the first and second circuit means 115 and 120.

The analog gate keyed clamp circuit operates to ground the input to the first and second circuit means 115 and 120 prior to the beginning of each scan cycle thereby to establish a zero volt DC reference level. Because of leakage currents through the photodetectors and the output voltage of these photodetectors due to stray light, the minimum voltage output of the summing amplifier 110 might be as much as 10 percent of the amplitude of the maximum output signal. Accuracy of measurement is therefore improved by shorting the output of capacitor C1 to ground, thereby establishing a zero reference prior to each scan cycle.

The first circuit means 115 includes level balance potentiometer R1 and a voltage divider, including resistors R2 and R3. This circuit provides tow voltage outputs; the first on line 135 which represents the composite output signal of the summing amplifier, as modified by the level potentiometer R1; and the second on line 136 which is a fixed percentage of the composite output signal. In the preferred embodiment of the invention, the voltage on line 136 is one-half the voltage on line 135.

The second circuit means 120 includes a delay line 140, the amount of delay being sufficient to allow the signal from each of the photodetectors to transition from its highest to lowest level at the slowest scan rate anticipated during the operation of the instrument. In the embodiment shown, this delay is one microsecond.

The second circuit means also includes a voltage divider including resistors R4 and R5; and this circuit therefore provides a first output on line 141 representing the delayed composite signal and a second output on line 142 representing a fixed percentage of the delayed composite signal. Again, this fixed percentage is the same as the fixed percentage in the first circuit means, and in the preferred embodiment is one-half the full output voltage.

The circuit 60 shown in FIG. 4 also includes a first comparator circuit 145 which is responsive to the first output on line 135 of the first circuit means 115 and to the second output on line 142 of the second circuit means 120. The inputs to this circuit are shown in waveform E of FIG. 5; and its output is illustrated by waveform F. This circuit 145 is a negative edge comparator, that is, it will produce an output on the trailing or negative going edge of the signal on line 135 when the voltage thereon equals the voltage on line 142.

The output of the first comparator circuit 145 is applied to a circuit means 150 for delaying this output by a time equal to the delay provided by the delay line 140, as shown by waveform G, and this pulse is applied to a positive or leading edge trigger circuit 155, the output of which is shown by the waveform H in FIG. 5.

Similarly, a second comparator circuit 160 is provided with the second or one-half value output on line 136 from the first circuit means 115 and the full magnitude signal from the second circuit means 120 as it appears on line 141. This input is shown by the waveform I in FIG. 5. The second circuit means is a positive edge comparator, that is, it will produce an output on the leading or positive going edge of the signal on line 141 when the value of that signal equals the signal on line 136; and its output is shown by the waveform J. This signal is applied to a positive or leading edge trigger 165, and its output is shown by the waveform K in FIG. 5.

An output circuit means or flip-flop 170 is provided in the circuit 60 of FIG. 4 for combining the delayed output of the first comparator circuit means (waveform H), and the output of the second comparator means (waveform K) to provide a composite signal which represents accurately when the beam intensity reaches one-half its maximum intensity as the beam scans across the edge of the article thereby to provide an accurate representation of the dimension of the article within the zone of measurement independently of any changes in the intensity of the beam or the electrical output signals from the photodetector and associated amplifiers which represent the intensity of the beam.

The leading edges of each pulse shown in the waveform F of FIG. 5, and the trailing edge of each of the pulses shown in the waveform J are due to the action of the scan threshold circuit 180 of FIG. 4 which compares the composite scan signal, waveform B, as it appears on line 135 against a reference voltage from source 181. This circuit disables the edge comparators when there is no output from any of the photodetectors and thus prevents the circuits 145 and 160 from producing outputs due to noise in the absence of photodetector outputs.

The edge comparator circuits 145 and 160 are preferably type LM 361 comparators manufactured by National Semiconductor. The circuit 145 is provided with a positive feedback circuit comprising capacitor C2 and resistor R6; and the circuit 160 is provided with a similar positive feedback circuit comprising capacitor C3 and resistor R7. In both feedback circuits the voltage on input pin #1 will momentarily be reduced at the time a comparison is obtained between pins #1 and #2; and this momentary reduction of input voltage will prevent multiple firings due to variations in the voltage on slowly rising signals on the pin #2 input. Since AC coupling is provided, this reduction of voltage at the time of firing is only momentary, and the feedback circuit does not therefore suffer from the same errors normally encountered when using DC hysteresis.

FIGS. 6 and 7A-7F illustrate the passage of a beam 12 across one edge of the article 90 being measured and a resulting electrical waveform produced by the photodetector 50.

In FIG. 7A, the beam 12 is shown tangent the article 90, and the full intensity of the beam is therefore applied to the photodetector 50. In this example, the beam will move horizontally from left to right, and as the beam scans toward the right, the intensity of the light at the photodetector will begin to decrease, as shown by the waveform 185 in FIG. 6. When one-half of the beam is obscured by the article, as shown in FIG. 7B, one-half of the intensity is received by the photodetector, which produces only one-half the maximum electrical output as compared to the full amplitude signal from that particular beam intensity. As the beam continues to move, the intensity of the light will further decrease, and finally reach zero when the beam is completely obscured as shown in FIG. 7C.

No light is received by the photodetector 50 as the beam continues to move across the article, and therefore its output will remain at zero until just after the beam reaches the position shown at FIG. 7D at which time the light from the beam which is detected by the photodetector 50 will begin to increase. When the beam is only half obscured, half of its intensity will reach the photodetector 50. Of course, it is not possible to determine the half intensity value until after the beam has reached its full intensity, and that occurs after the entire beam has cleared the object, as shown in FIG. 7F.

Thus, the dimension D1 is determined by the size of the article and the size of the beam in its direction of movement and represents the first and last contact of the beam with the article. The dimension D2 represents the size of the article and is determined by when the beam intensity reaches its half-maximum aplitude. The dimension D3 is also determined by the size of the beam and represents a dimension when the beam is completely blocked by the article.

In FIG. 6, the waveform 185 represents a full intensity beam having a maximum aplitude, for example, of twenty units. The waveform 186, on the other hand, represents a waveform from a lower intensity beam, and this waveform is shown having a maximum amplitude of approximately 12 units. This reduced amplitude may be caused by many factors, including, but not limited to, an attenuation of the light output due to the characteristics of the optical system; dust, dirt, and moisture within the zone of measurement; and changes in line voltage and in the laser output.

It is clear from FIG. 6 that if the half-maximum value of either of waveforms 185 or 186 is used, the dimension measurement D2 will be the same, and therefore this can be relied upon as an accurate indication of the dimension of the article within the zone measurement. If, however, a fixed threshold voltage were established as an indication of the beam passage across the edge of the article, for example six units, then the dimension D4 would represent the size of the article when the beam intensity were full, as represented by waveform 185, while dimension D2 would represent the size of the article when the intensity of the beam was at the amplitude represented by waveform 186.

Accordingly, by using the one-half maximum amplitude value of the beam, regardless of its actual amplitude, an accurate and repeatable measurement of the dimension of an object placed in the zone of measurement can be made.

In the example given above, the beam is shown in FIG. 7 to be circular; however, it is to be understood that the beam could be in any shape and the technique disclosed here used.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

What is claimed is:

1. In an optical micrometer wherein a beam of light is scanned across an article placed within a zone of measurement and wherein the time of interruption of the beam is a function of the size of the article, a method for determining accurately when the beam crosses the edges of the article including the steps of
    generating a first set of electrical signals representing the intensity of the beam after it passes through the zone of measurement including a full-amplitude real time signal and a half-amplitude real time signal,
    generating a second set of signals delayed in time from the first set of signals including a full-amplitude delayed signal and a half-amplitude delayed signal,
    sensing when the beam is obscured by the article by comparing said full-amplitude real time signal and said half-amplitude delayed signal to produce a first output signal,
    sensing when the beam emerges from the outer edge of the article by comparing said half-amplitude real time signal and said full-amplitude delayed signal to produce a second output signal,
    delaying the first output signal by the amount of the time delay, and
    combining the delayed first output signal and the second output signal to provide a composite output signal which represents the size of the article within the zone of measurement.

2. In an optical micrometer including means for scanning a light beam across an article and means for sensing the presence of the beam to generate electrical signals which transition from one state to another as the beam is interrupted by the presence of the article and wherein the magnitude of said signals may vary
    the improvement comprising
    first circuit means responsive to said electrical signals from said light sensing means for providing a first output representing said signals and a second output representing a fixed percentage of said signals,
    second circuit means responsive to the output of said light sensing means for delaying said electrical signals by a predetermined time and for providing a first output representing the delayed signals and a second output representing a fixed percentage of said delayed signals,
    first comparator circuit means responsive to the first output of said first circuit means and to the second output of said second circuit means for generating an output at one transition of said signals,
    second comparator circuit means responsive to the second output of said first circuit means and to the first output of said second circuit means for generating an output at the other transition of said signals,
    means for delaying the output of the first comparator circuit means, and
    output circuit means for combining the delayed output of the first comparator circuit means and the output of the second comparator circuit means thereby to provide a composite signal representing accurately the location of the edges of the article independently of changes in the magnitude of electrical signals.

3. The optical micrometer of claim 2 wherein said first and second circuit means are capacitively coupled to said means for generating electrical signals, said optical micrometer further including
    means for detecting each scan cycle,
    means responsive to said detecting means for shorting to a zero level the inputs to said first and second circuit means prior to each scan cycle.

4. The optical micrometer of claim 2 wherein said first and second comparator means each having a first or full amplitude input and a second or half amplitude input, and wherein each of said circuit means includes feedback means connected between the output of said comparator means and its half amplitude input for reducing momentarily the amplitude of the half amplitude input when an output is generated and thereby to prevent multiple output signals.

5. The optical micrometer of claim 2 wherein the second outputs of both said first circuit means and said second circuit means represent one-half the amplitude of the first outputs from said circuit means.

6. In an optical micrometer wherein a beam of light is scanned across an article placed within a zone of measurement and wherein the time of interruption of the beam is a function of the size of the article, a method for determining accurately when the beam crosses the edges of the article including the steps of
    generating a first set of electrical signals representing the intensity of the beam after it passes through the zone of measurement including a full-amplitude real time signal and a partial-amplitude real time signal,
    generating a second set of signals delayed in time from the first set of signals including a full-amplitude delayed signal and a partial-amplitude delayed signal,
    sensing when the beam is obscured by the article by comparing said full-amplitude real time signal and said partial-amplitude delayed signal to produce a first output signal,
    sensing when the beam emerges from the other edge of the article by comparing said partial-amplitude real time signal and said full-amplitude delayed signal to produce a second output signal, and
    combining the first output signal and the second output signal to provide a composite output signal which represents the size of the article within the zone of measurement.

7. The method of claim 6 further including the step of delaying the first output signal by an amount of time equal to said time delay introduced in generating said second set of signals.

8. In an optical micrometer including means for scanning a light beam across an article placed within a zone of measurement and light sensing means for sensing the presence of the beam to generate electrical signals in response to the intensity thereof the improvement comprising first circuit means responsive to said electrical signals from said light sensing means for providing a first output representing said signals and a second output representing a fixed percentage of said signals, second circuit means responsive to said electrical signals for delaying said electrical signals by a predetermined time and for providing a first output representing the delayed signals and a second output representing a fixed percentage of said delayed signals, first comparator circuit means responsive to the first output of said first circuit means and to the second output of said second circuit means for generating an output when the intensity of the beam is reduced by said fixed percentage from its instantaneous maximum value, second comparator circuit means responsive to the second output of said first circuit means and to the first output of said second circuit means for generating an output when the intensity of the beam increases to said fixed percentage of its instantaneous maximum value, and output circuit means for combining the output of the first comparator circuit means and the output of the second comparator jcircuit means thereby to provide a composite signal representing accurately the location of the edges of the article independently of instantaneous changes in the magnitude of said electrical signals.

9. The optical micrometer of claim 8 further including means for delaying the output of said first comparator means by said predetermined time delay.

10. The optical micrometer of claim 8 wherein said fixed percentage of said signals is one-half.

* * * * *